May 13, 1958 C. F. BACHLE 2,834,417
ENDLESS TRACK VEHICLE BRAKE MECHANISM
Filed Dec. 22, 1955
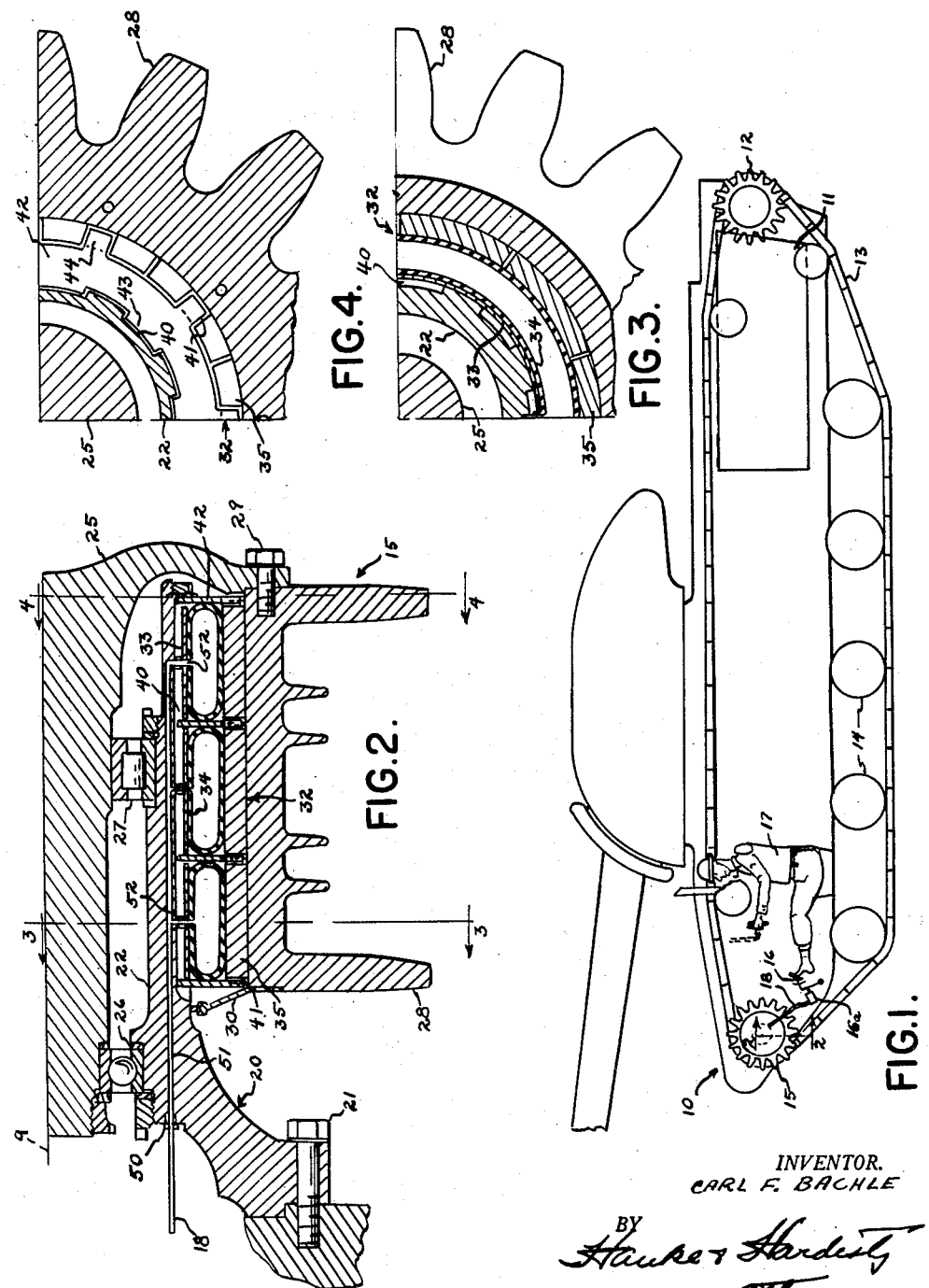
INVENTOR.
CARL F. BACHLE
BY
Hauser & Hardesty
attorneys.

United States Patent Office 2,834,417
Patented May 13, 1958

2,834,417

ENDLESS TRACK VEHICLE BRAKE MECHANISM

Carl F. Bachle, Grosse Pointe, Mich., assignor to Continental Aviation and Engineering Corporation, Detroit, Mich., a corporation of Virginia Application December 22, 1955, Serial No. 554,810

5 Claims. (Cl. 180—9.1)

This invention relates to track-laying vehicles such as tanks and the like, and more particularly to a front sprocket brake therefor of the hydraulic expandable tube type.

The general practice heretofore followed with regard to heavy track-laying vehicles such as tanks, gun carriers and heavy construction equipment, has been to mount the brake therefor at the rear of the vehicle in the transmission. Since with such heavy vehicles, any braking is necessarily accompanied by a considerable generation of heat, the heat is often absorbed by the transmission components and the transmission oil itself, which unnecessarily raises the operating temperature of the transmission. In addition, other problems arise in the utilization of space in the generally restricted transmission area.

Therefore, an object of this invention is to eliminate the transfer of braking heat aforesaid and to solve the many inherent problems encountered with present brakes by providing a brake mounted at the front track-carrying sprocket of the vehicle to facilitate air cooling of the brake.

Another object of the invention is to accomplish the above while providing an efficient brake contact area with the sprocket such as will be sufficient to stop the vehicle in the short time often necessitated in operation.

A further object of the invention is to solve the aforesaid problems by providing an efficient brake at the front sprocket of the vehicle while leaving the track carrying capabilities and operation of the sprocket unimpaired.

Yet another object of the invention is to improve braking of a track-laying vehicle by providing a simplified fluid pressure brake utilizing the greatest available braking surface of a sprocket wheel.

Still another object of the invention is to facilitate braking of a track-lying vehicle by providing an improved brake assembly comprising axially movable brake shoes adapted to contact an inner sprocket wheel surface and actuated by annular expandable boats.

A still further object of the invention is to improve brake construction in track-laying vehicles providing a sprocket wheel constructed to be supported within a tubular axle and to overlie the outer surface of the axle to facilitate assembly of a braking mechanism between the outer axle surface and the inner sprocket wheel surface.

Yet a further object of the invention is to provide a more efficient brake for a track-laying vehicle by constructing a sprocket wheel annularly overlying and spaced from the vehicle axle, and supported by said axle through a hub extending therein, the entire width of the sprocket wheel surface overlying said axle being used for a braking surface.

A more complete understanding of this invention may be had by reference to the accompanying drawings illustrating a preferred embodiment of the invention, in which like characters refer to like parts throughout the several views and in which Fig. 1 is aschematic side elevational representation of a track-laying vehicle, Fig. 2 is a fragmentary cross-sectional view on line 2—2 of Fig. 1 and illustrating the brake mechanism of the present invention, Fig. 3 is a fragmentary section on line 3—3 of Fig. 2, and Fig. 4 is a fragmentary section on line 4—4 of Fig. 2.

As will be seen, Fig. 1 illustrates a tank 10 or similar vehicle having an engine and transmission 11 in the rear which drivingly connects with rear track sprocket 12. The rear sprocket 12 in turn drives a track 13 which is carried on the vehicle by track bogeys 14 and a front sprocket wheel assembly 15, which is braked upon actuation of the hydraulic or pneumatic brake pedal 16 by an operator 17.

The brake pedal 16 controls a valve 16a which directs fluid pressure through a conduit 18 to the braking means for the front sprocket wheel assembly 15. It will be observed that the position of the front sprocket wheel assembly 15 is more or less open and at the forwardmost part of the vehicle, where it is subject most effectively to the cooling action of the air, and where it is the least likely to transmit heat to other vehicle components.

An axle assembly 20 is mounted to the vehicle 10 with bolts 21 or other suitable means, and includes a generally tubular section 22. The sprocket wheel assembly 15 comprises a hub portion 25 which is rotatably supported within the axle tubular section 22 by means of an inner ball bearing assembly 26 and an outer roller bearing assembly 27, or by any adequate bearing means. A sprocket wheel 28, which is mounted to the hub 25, preferably by bolts 29, is adapted to surround and be spaced from the tubular section 22, and a dust shield 30 is secured to the inner end of the sprocket wheel 28. It should be noted that Fig. 2 shows only about half of the whole assembly, the upper portion being substantially symmetrical to the portion shown about the axis 9 of the axle.

A brake mechanism 32 comprises an inner cylindrical sleeve 33 fitting closely around the axle tubular section 22, and expandable closed tubes 34 which are disposed parallel to each other and annularly around the sleeve 33 and preferably bonded thereto. A plurality of brake shoes 35 are preferably bonded in angular spaced relation to the expandable tubes 34.

A series of angularly spaced recesses or axially extending grooves 40 are provided around the periphery of the axle tubular section 22, as shown in Fig. 2. The brake shoes 35 are provided with recesses 41 at their sides. Retainer plates 42 which encircle the axle section 22 have inner lugs 43 and outer lugs 44, which engage respectively with the axle tubular section grooves 40 and the brake shoe recesses 41, and serve to prevent rotation or angular displacement of the brake shoes with respect to the axle.

The conduit 18 is connected by a suitable fitting 50 to a bore 51 drilled longitudinally through the axle tubular section 22, and ports 52 connect the conduit 18 by means of suitable connections with the interior of the expandable tubes 34.

In operation, fluid pressure is directed through the conduit 18 and the ports 52 to the interior of the tubes 34 on actuation of the brake pedal 16. The tubes are thus expanded, forcing the plurality of brake shoes 35 outwardly and into frictional braking contact with the inner surface of the sprocket wheel 28. The retainer plates 42 prevent the brake shoes 35 from rotating with respect to the sprocket wheel 28.

It will be observed that the construction embodied in this invention utilizes the greatest available braking surface of the sprocket wheel in the most efficient manner. This is obviously required due to the high momentum attained by such heavy vehicles at even relatively slow speeds and the necessity for providing the shortest possible stopping time. The brake mechanism itself does not add to the effective width or diameter of the sprocket wheel, and construction is relatively simplified, permitting maintenance to be performed in the field quickly and easily.

Although but one preferred embodiment of this invention is described, it will be apparent to one skilled in the art to which the invention pertains, that various modifications and changes may be made therein without departing from the spirit of the invention or from the scope of the appended claims.

I claim:

1. In a track laying military vehicle having driving means and a track driven thereby, a sprocket wheel and brake mechanism assembly adapted to be supported by a front axle of said vehicle, said sprocket wheel being rotatably carried on said axle, said sprocket wheel carrying said track and rotated thereby, said brake mechanism comprising a plurality of segmental brake shoes annularly arranged and carried by said axle, said brake shoes operable to be radially urged in braking contact with said sprocket wheel actuating means for said brake shoes, and retaining means operable to restrain said brake shoes against angular displacement with respect to said axle, said axle comprising a substantially tubular supporting member, said sprocket wheel comprising a hub portion rotatably carried internally of said axle tubular member and a sprocket portion carried by said hub portion and having an inner cylinder forming a brake drum element concentric with and radially spaced from the outer surface of said axle tubular member, said brake shoes arranged in the space between said axle and said sprocket wheel inner cylinder and adapted to be selectively urged into frictional braking contact with said inner cylinder.

2. In a track laying military vehicle having driving means and a track driven thereby, a sprocket wheel and brake mechanism assembly adapted to be supported by a front axle of said vehicle, said sprocket wheel being rotatably carried on said axle, said sprocket wheel carrying said track and rotated thereby, said brake mechanism comprising a plurality of segmental brake shoes annularly arranged and carried by said axle, said brake shoes operable to be radially urged in braking contact with said sprocket wheel, actuating means for said brake shoes, and retaining means operable to restrain said brake shoes against angular displacement with respect to said axle, said axle comprising a substantially tubular supporting member, said sprocket wheel comprising a hub portion rotatably carried internally of said axle tubular member and a sprocket portion carried by said hub portion and having an inner cylinder forming a brake drum element concentric with and radially spaced from the outer surface of said axle tubular member, said brake shoes arranged in the space between said axle and said sprocket wheel inner cylinder and adapted to be selectively urged into frictional braking contact with said inner cylinder, said inner cylinder extending substantially the entire width of said sprocket wheel, and said brake shoes being substantially coextensive with said cylinder whereby to utilize substantially the complete inner cylinder as a braking surface.

3. In a track laying military vehicle having driving means and a track driven thereby, a sprocket wheel and brake mechanism assembly adapted to be supported by a front axle of said vehicle, said sprocket wheel being rotatably carried on said axle, said sprocket wheel carrying said track and rotated thereby, said brake mechanism comprising a plurality of segmental brake shoes annularly arranged and carried by said axle, said brake shoes operable to be radially urged in braking contact with said sprocket wheel, actuating means of said brake shoes, and retaining means operable to restrain said brake shoes against angular displacement with respect to said axle, said axle comprising a substantially tubular supporting member, said sprocket wheel comprising a hub portion rotatably carried internally of said axle tubular member and a sprocket portion carried by said hub portion and having an inner cylinder forming a brake drum element concentric with and radially spaced from the outer surface of said axle tubular member, said brake shoes arranged in the space between said axle and said sprocket wheel inner cylinder and adapted to be selectively urged into frictional braking contact with said inner cylinder, said inner cylinder extending substantially the entire width of said sprocket wheel, and said brake shoes being substantially coextensive with said cylinder whereby to utilize substantially the complete inner cylinder as a braking surface, said actuating means comprising a plurality of adjacent annular expandable tubes disposed intermediate said brake shoes and said axle and operable on expanding to urge said brake shoes radially outward, said tubes collectively being substantially coextensive in width with the brake shoes and the inner cylinder, and means selectively directing fluid pressure into said tubes.

4. In a track laying military vehicle having driving means and a track driven thereby, a sprocket wheel and brake mechanism assembly adapted to be supported by a front axle of said vehicle, said sprocket wheel being rotatably carried on said axle, said sprocket wheel carrying said track and rotated thereby, said brake mechanism comprising a plurality of segmental brake shoes annularly arranged and carried by said axle, said brake shoes operable to be radially urged in braking contact with said sprocket wheel, actuating means for said brake shoes, and retaining means operable to restrain said brake shoes against angular displacement wtih respect to said axle, said axle comprising a substantially tubular supporting member, said sprocket wheel comprising a hub portion rotatably carried internally of said axle tubular member and a sprocket portion carried by said hub portion and having an inner cylinder forming a brake drum element concentric with and radially spaced from the outer surface of said axle tubular member, said brake shoes arranged in the space between said axle and said sprocket wheel inner cylinder and adapted to be selectively urged into frictional braking contact with said inner cylinder, said inner cylinder extending substantially the entire width of said sprocket wheel, and said brake shoes being substantially coextensive with said cylinder whereby to utilize substantially the complete inner cylinder as a braking surface, said actuating means comprising a plurality of adjacent annular expandable tubes disposed intermediate said brake shoes and said axle and operable on expanding to urge said brake shoes radially outward, said tubes collectively being substantially coextensive in width with the brake shoes and the inner cylinder, a fluid passage in said axle supporting member and openly connected with said tubes, and means selectively directing fluid pressure into said passage.

5. In a track laying military vehicle having driving means and a track driven thereby, a sprocket wheel and brake mechanism assembly adapted to be supported by a front axle of said vehicle, said sprocket wheel being rotatably carried on said axle, said sprocket wheel carrying said track and rotated thereby, said brake mechanism comprising a plurality of segmented brake shoes annularly arranged and carried by said axle, said brake shoes operable to be radially urged in braking contact with said sprocket wheel, actuating means for said brake shoes, and retaining means operable to restrain said brake shoes against angular displacement with respect to said axles, said axle comprising a substantially tubular supporting member, said sprocket wheel comprising a hub portion rotatably carried internally of said axle tubular member and a sprocket portion carried by said hub portion and having an inner cylinder forming a brake drum element concentric with and radially spaced from the outer surface of said axle tubular member, said brake shoes arranged in the space between said axle and said sprocket wheel inner cylinder and adapted to be selectively urged into frictional braking contact with said inner cylinder, said retaining means comprising at least one annular plate disposed intermediate said axle tubular member and said sprocket wheel inner cylinder and in a plane normal to said axle axis, said plate having spaced radially extending lugs on the inner and outer edges thereof, said axle tubular member having recesses adapted for engagement with said plate inner lugs, and said brake shoes having recesses adapted for engagement with said plate outer lugs.

References Cited in the file of this patent

UNITED STATES PATENTS

| | | |
|---|---|---|
| 1,822,991 | Jett | Sept. 15, 1931 |
| 2,483,473 | Passelegue | Oct. 4, 1949 |
| 2,640,565 | Hoppenstand | June 2, 1953 |

FOREIGN PATENTS

| | | |
|---|---|---|
| 313,090 | Italy | Dec. 11, 1933 |